United States Patent [19]

Coleman et al.

[11] 3,754,459

[45] Aug. 28, 1973

[54] IDEOGRAPHIC-LANGUAGE INPUT APPARATUS PUBLICATION SYSTEM UTILIZING SAME

[75] Inventors: Aaron H. Coleman, Levittown, Pa.; Hugh W. Stewart, Princeton, N.J.

[73] Assignee: CPS Associates, Inc., Croydon, Pa.

[22] Filed: June 2, 1972

[21] Appl. No.: 259,195

[52] U.S. Cl. .......... 95/4.5, 197/1

[51] Int. Cl. .......... B41b 13/10

[58] Field of Search .......... 95/4.5; 197/1

[56] References Cited

UNITED STATES PATENTS

| | | | |
|---|---|---|---|
| 2,950,800 | 8/1960 | Caldwell | 197/1 |
| 3,273,476 | 9/1966 | Haynes | 95/4.5 |
| 3,325,786 | 6/1967 | Shashoua | 340/172.5 |
| 3,553,676 | 1/1971 | Racita | 95/4.5 |
| 3,588,870 | 6/1971 | Kolb | 95/4.5 |

*Primary Examiner*—John M. Horan
*Attorney*—Dexter N. Shaw, Albert L. Free et al.

[57] ABSTRACT

A coordinate digitizer is utilized in a phototypesetting automatic publications system, by means of which ideographic symbols are selected and electrically entered into the system. An array or "menu" of ideographic symbols is provided, and a coordinate digitizer including a pointer is connected so that designation of a particular symbol in the array by the pointer causes the generation of signals representative of the coordinates of that symbol in the array. A computer memory stores data for each of the symbols so that when coordinate signals corresponding to a particular symbol in the array are supplied to the computer means, the corresponding data are retrieved and utilized to form that symbol in the phototypesetter. The data thus retrieved from the computer memory are also utilized to operate a local symbol display, such as a facsimile recorder or cathode-ray tube display device, positioned adjacent the coordinate digitizer so that rapid proofing of the entered symbols may be provided. Preferably the ideographic-data input terminal is remote from the computer storage means and connected thereto by an appropriate communications link, and preferably scan converting means are provided adjacent the computer storage means to produce signals representing a lower-definition version of the symbols to be reproduced, which latter signals are sent back to the remote terminal to form the local display. Editing and format commands are also included in the "menu" to effect editing and composing of the text.

4 Claims, 4 Drawing Figures

Patented Aug. 28, 1973 3,754,459

3 Sheets-Sheet 1

Patented Aug. 28, 1973 3,754,459

3 Sheets-Sheet 2

Patented Aug. 28, 1973 3,754,459

3 Sheets-Sheet 3

IDEOGRAPHIC-LANGUAGE INPUT APPARATUS PUBLICATION SYSTEM UTILIZING SAME

BACKGROUND OF THE INVENTION

Electrical typewriters are known for providing electrical input of phonetic characters into an electrical character-recording system. For example, in a simple 26 letter alphabet a simple manually-operated typewriter keyboard is convenient for such purposes. However, in certain ideographic languages, such as ideographic Japanese, the number of different ideographic characters becomes very large; for example, in such languages the number of ideographic characters may be of the order of 10,000 or more. A manual typewriter of the usual type using such a large number of characters is awkward and slow to operate.

In some cases, a suitable ideographic character data-input device would be useful in providing "hard-copy" of ideographic text at the location of the data input device in the form of hard copy, thus providing a function similar to the usual typewriter. In other cases, an ideographic data-input device will find utility in connection with automatic publications systems, particularly one of the phototypesetting class, in which the data-input device may be used to input not only ideographic characters but also suitable editing and typographic format commands, thereby to enable automatic production of composed ideographic text. Such an automatic publications system to which this invention may be applied is described and claimed in our co-pending application Ser. No. 242,409, filed Apr. 10, 1972 and entitled Automatic Publications System and Method. Such a system provides a central computer-controlled phototypesetting apparatus and remote data-input terminals electrically connected thereto through an appropriate communication link, by means of which text, line drawings and photographs may be electrically entered into the system, and editing and complete page composition effected, while providing for proof display at the remote terminals nearly instantaneously and at any desired point in the process. The ideographic data-input device of the present invention may be utilized as one of the remote terminals in such an automatic phototypesetting publication system.

Accordingly it is an object of the invention to provide a new and useful electrical data-input device for ideographic characters.

A further object is to provide such a device which also provides input of editing and/or typographic format commands.

A further object is to provide an ideographic data-input device which will provide local proof display of the ideographic characters entered into the system, either as a temporary display or in the form of hard copy.

Another object is to provide such an ideographic data-input device which operates in combination with a central computer shared by other similar ideographic data input devices.

It is also an object to provide such an ideographic data input device for use in a remote terminal of an automated electronic phototypesetting publications system.

SUMMARY OF THE INVENTION

These and other objects of the invention are achieved by the provision of apparatus comprising: an array of ideographic characters, and character-selection means preferably comprising pointer means for designating selected ones of said characters in said array and coordinate sensing means responsive to said designating of characters for producing signals representative of the coordinates of said selected characters. In operation, the array or "menu" of ideographic characters in first made up, and the operator utilizes the pointer means to select the characters which he wishes to have entered into the system, the coordinate sensing means producing an electrical signal representing each character by its coordinates in the array.

Also preferably employed are data-storage means for storing data representing the characters in the array, which data storage means is responsive to the coordinate-representing signals to retrieve from the storage means those data corresponding to the selected characters. In the preferred form, these data represent, in effect, electrical type needed to form the ideographic characters, and may be stored in several sizes and font types. Image-forming means are preferably provided which respond to the retrieved data to produce an image of each of the selected characters represented by the retrieved data.

Preferably, image-forming means are provided adjacent the character array so that the operator may see and proof what he has just entered into the system; if a facsimile recorder or the like is utilized, hard copy of the input is thereby obtained for proofing, much as in the functioning of the usual typewriter for phonetic symbols.

Where the ideographic data input device is utilized as part of an automated phototypesetting publication system, the ideographic character data retrieved from the storage means are utilized to operate the phototypesetter, and in addition may be utilized to operate a scan converter for forming an output signal corresponding to a lower-definition version of the character image produced in the phototypesetter. The latter output signal is then conveniently transmitted back to the ideographic data input terminal to operate the local display. In this latter form, the ideographic data input device may constitute one of the terminals in the publications system described in our above identified co-pending application.

BRIEF DESCRIPTION OF THE FIGURES

These and other objects and features of the invention will be more readily understood from a consideration of the following detailed description, taken in connection with the accompanying drawings, in which.

DETAILED DESCRIPTION OF SPECIFIC EMBODIMENTS

Figure 1:
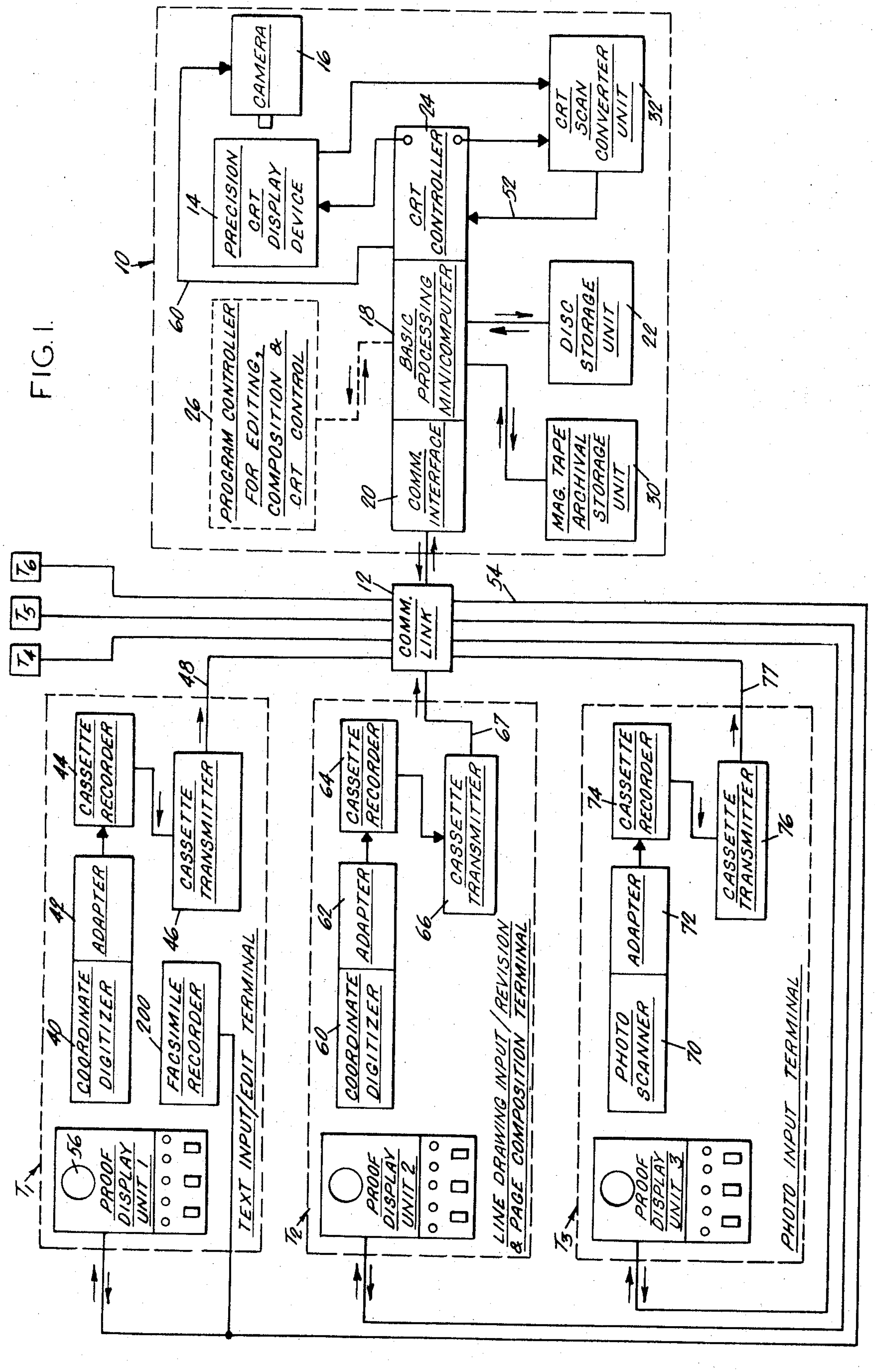
FIG. 1 is a block diagram of an automated publications system utilizing a remote terminal including ideographic data input apparatus in accordance with the invention.
Figure 2:
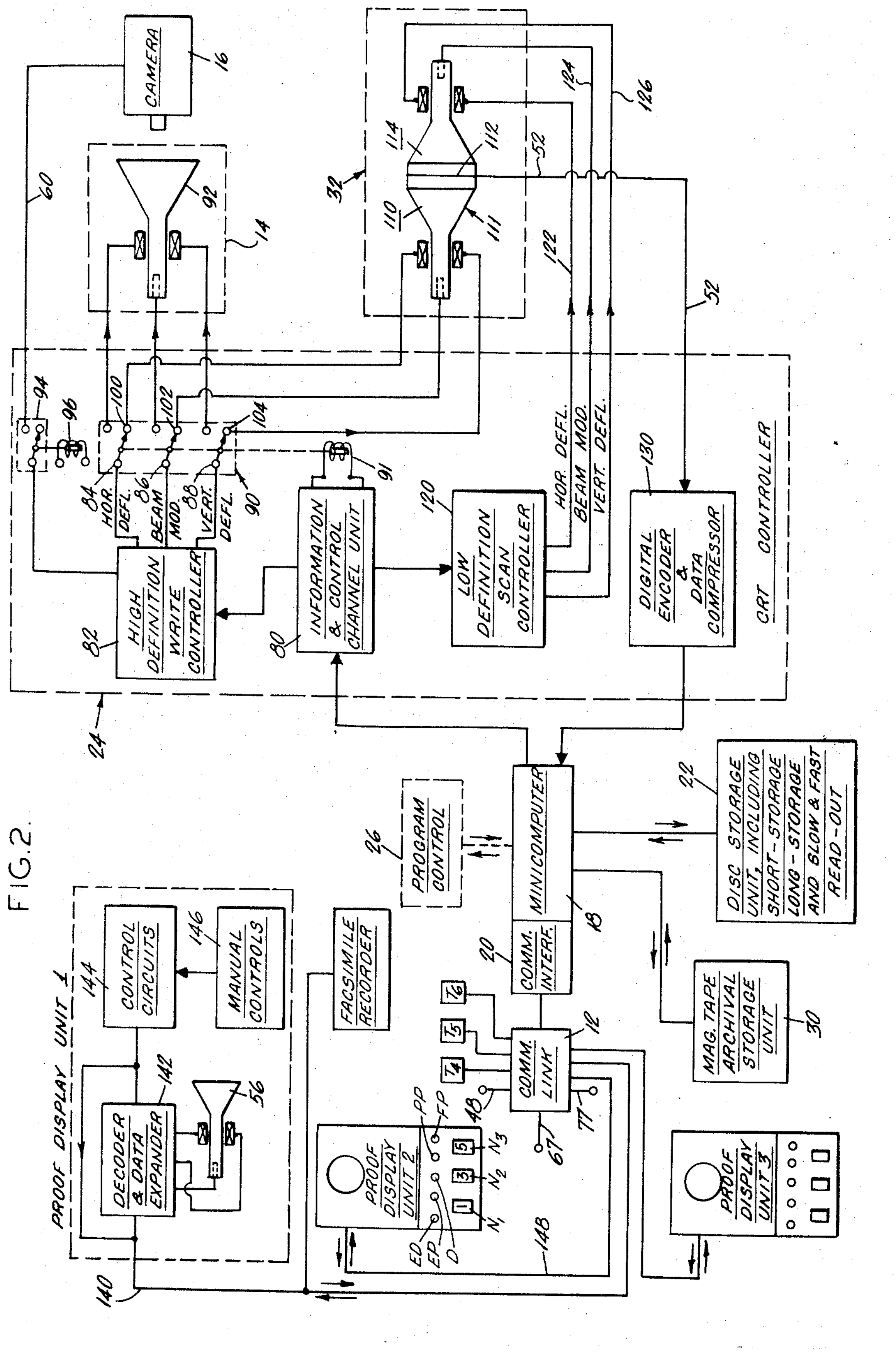
FIG. 2 is a diagram, partly in block form and partly in electrical schematic form, showing in further detail certain of the portions of the system of FIG. 3.

FIGS. 1 and 2 hereof are the same as FIGS. 1 and 2 of our above-identified co-pending application with the exception that remote terminal $T_1$ is different. In particular, $T_1$ of our co-pending application utilizes a standard electric typewriter 40 for text, editing, and command input, the output of which typewriter is passed through an adapter 42 to a cassette recorder 44; a cassette transmitter-receiver 46 is also provided therein by means of which the recorded text, edit and format commands contained in recorder 44 may be delivered through the communication link 12 to the central station 10, and by means of which updated text may be received from central station 10 and delivered back to cassette recorder 44 and by the electric typewriter operated to produce hard copy of edited text. Such a terminal may in fact be utilized in the system of the present invention in addition to the ideographic input terminal of the invention, for use where phonetic characters are to be used extensively or where, for example, substantial English text is to be interleaved with the ideographic text. However, in the present example the electricl typewriter terminal is shown replaced by the ideographic symbol terminal, an arrangement which is suitable for all Japanese publications for example.

Thus in FIG. 1 of the present application, the electric typewriter has been replaced by the coordinate digitizer 40, and the cassette transmitter-receiver 46 of said co-pending application is replaced by a simple cassette transmitter 46 similar to the cassette transmitter 66 in terminal $T_2$. It will be observed that the terminal $T_1$ of the present application may be very similar to or substantially identical with terminal $T_2$ of said co-pending application. It is in fact possible to utilize terminal $T_2$ to perform the functions of terminal $T_1$ in the present case, although the separate facilities $T_1$ and $T_2$ are shown, since where there are substantial amounts of line drawings and of ideographic text it will be helpful to have two separate terminals for this different input subject-matter.

In addition, terminal $T_1$ in the present example specifically includes the facsimile recorder 200 in addition to the cathode-ray tube display unit 1, although in some cases only one of the other of these proof display devices will be utilized.

Since the remainder of the system shown in FIGS. 1 and 2 of this application is identical in form and operation to corresponding portions of the system described in said co-pending application, the description of these common portions of the system set forth in said co-pending application is included herein by reference.

In brief, the system includes a remote station at one location comprising remote terminals $T_1$, $T_2$ and $T_3$ providing the respective input functions of text input/edit, line drawing input/revision and page composition, and photo input. Each of these terminals is connected through a communications line 12 to a central station 10. The central station includes the basic data processing mini-computer 18 communicating with the communications link by means of the communication interface 20 and operating, in conjunction with the program controller 26 for editing, composition and CRT control, the disc storage unit 22, magnetic tape archival storage unit 30 and CRT controller 24. The precision CRT display device 14 controlled from CRT controller 24 forms a high-definition image of the composed text, which is photographed by the camera 16 to provide proof copy or final copy. For prompt remote proofing, scan converter unit 32 is supplied with the signals from the CRT controller and produces an output signal in the form of facsimile-like line-by-line electrical representations of the high-definition image. The latter output signal from the scan converter unit is preferably reduced in bandwidth for convenient communication back through communications link 12 to the proof display unit at the terminal requesting such proof display.

Figure 3:
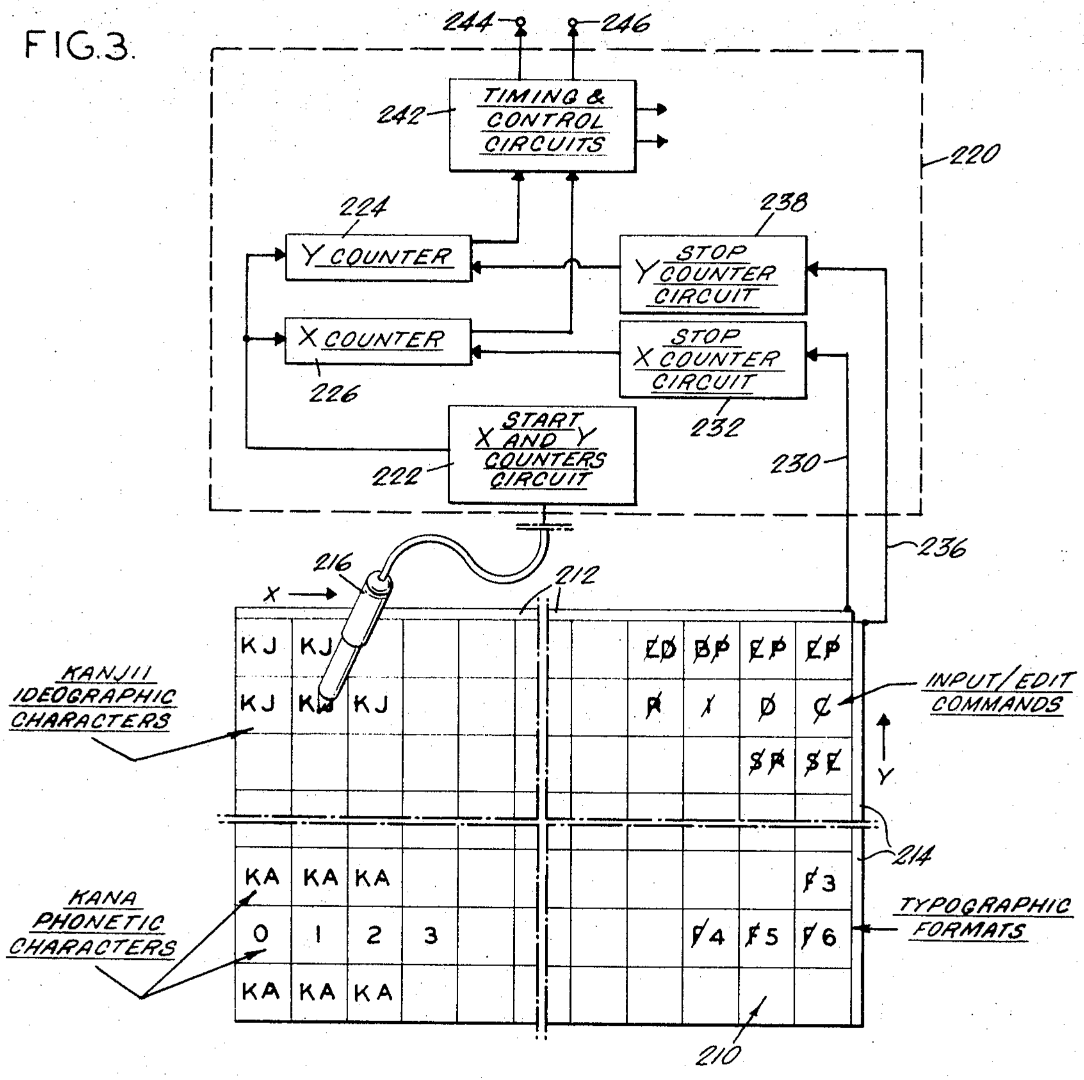
FIG. 3 is a schematic representation, partly in block form, of an ideographic data input device in accordance with the invention in one of its forms.

Referring now to FIG. 3, there is shown therein a suitable form for the ideographic character coordinate digitizer 40 of terminal $T_1$. There is provided an array or "menu" 210 0f ideographic symbols, in this case represented as "KJ" to avoid the need for actually depicting real ideographic characters in the drawing, it being understood that each of the ideographic characters differs from the others. Such ideographic characters in the Japanese language are generally designated as Kanjii. The Japanese also employ phonetic characters known as Kana, and such characters are shown by the representations "KA;" also included are the usual numerals 0 through 9.

In another set of locations on the array or "menu" there are provided input/edit commands shown as English letters with slant lines through them, although for use in Japanese publications these abbreviations or symbols would generally be in some Japanese symbolic form. Typeographic formats comprising the letter F with a slant line through it followed by a numeral are also provided at various locations in the array.

In the particular example shown, the array comprises a rectangular matrix of square zones each containing a Kanjii symbol, or a Kana symbol, or an input/edit command symbol, or a typographic format symbol. It is understood that the array as shown is broken along both dimensions, since in actuality there may be of the order of 10,000 squares in the matrix.

The array 210 is provided with a Y coordinate sensor 212, which in this example may be a microphone system extending in the X direction along the upper boundary of the array. An X coordinate sensing device 214 extends similarly along the Y direction at one edge of the array as shown. An electrical pointer 216 is provided which may be of known form such that when an operator presses the tip of the pointer against a particular square in the array, a spark will be generated producing a sharp, short pulse of sound. The digitizer electronics 220 responds to pick-up of the sound pulse by the microphone systems 212 and 214 to produce digital indications of the X and Y coordinates of the square or character being indicated by the application of the point of the pointer.

More particularly, in this example when the pointer is pressed against a character square to produce a spark, a connection is closed which operates the Start X And Y Counters Circuit 222. This causes the X counter 224 and the Y counter 226 to start digital counts at this same time. When the microphone system 212 receives the electronic pulse from pointer 216, a signal is generated and applied over lead 230 to Stop Y Counter 232 to arrest the counting action of the Y counter 226. Similarly, when the accoustic pulse is received by the microphone system 214, the signal delivered over lead 236 operates the Stop X Counter Circuit 238 to arrest counting in X counter 224. Since the time required for the acoustic pulse from pointer 216 to travel to microphone system 214 is proportional to the X coordinate of the symbol being designated by the pointer, the X counter will be arrested at a count proportional to the X coordinate of the symbol being indicated; similarly, the final count in the Y counter is proportional to the Y coordinate of the indicated symbol on the array 210. The outputs of the X and Y counters are supplied to the timing and controls circuits 242 and thence to the output terminals 244 and 246 respectively. The timing and control circuits will normally include other devices and connections to provide the necessary timing and transfer functions required to achieve the above-described operation.

It will be understood that such coordinate digitizers are well known in the art and commercially available, and hence the details of their contruction and operation need not be set forth herein. Further, it will be understood that there is a variety of quite different types of coordinate sensors and digitizers which may be used. The primary function of such an arrangement is to provide at the output terminals 244, 246 digital signals respectively indicative of the X and Y coordinates of the symbol being designated by the pointer. It will be appreciated then that the apparatus shown in FIG. 3 hereof comprises an arrangement for providing at output terminals 244 and 246 a pair of signals which uniquely identify one of the ideographic or phonetic characters, or one of the input/edit commands, or one of the typographic format commands on the array 210. These identifying coordinate signals pass through adapter 42 and are recorded on cassette recorder 44 in a manner similar to the operations produced in response to electric typewriter 40 in our above-identified co-pending application.

In normal use, the text information will be inserted by the operator or writer by pointing in sequence to these various characters on the array which constitute such text. When a similarly selected input command so orders, the recorded information will be transmitted through the communication link 12 to the minicomputer 18. To each set of coordinates there corresponds a set of data stored in the disc storage unit 22 and representing the digital signals required to reproduce a particular character on the precision CRT display device 14. Thus the disc storage unit 22 may contain stored sets of signals each representing the manner in which the beam of the precision CRT display device 14 should be controlled to reproduce a particular ideographic character or phonetic character on the array or menu. Supplying of the given set of X Y coordinates to the mini-computer causes data representing a particular character to be called out of memory and used to write the corresponding character on the precision CRT display device.

In the particular form of apparatus illustrated in more detail in FIG. 2, operation of the display button D on the proof display unit 1 causes the selected character or characters to be formed in the CRT scan converter unit 32, wherein the characters are scanned to form a facsimile-type line-by-line representation of the particular character. As described in our co-pending application, such output signal of the scan converter is preferably digitally encoded, data compressed, and sent back to the particular terminal requesting it. At that terminal, the ideographic character or characters will be displayed on the cathode-ray tube of the proof display unit, and/or printed out on the facsimile recorded 200. If errors are detected, or changes wanted for any reason, the input/edit command and the typographic format may be utilized generally as described in our co-pending application, but with the modification that the commands and format are determined by applying the pointer 216 of FIG. 3 of this application to the character or symbol in the array 210 corresponding to the desired command. The coordinate digitizer and array shown in FIG. 3 therefore, in effect, takes the place of the electric typewriter, the facsimile recorder 200 providing hard copy at any point in the publications procedure which can be read and even passed around to a number of people for purposes of review and further editing. The use of the facsimile recorder in this arrangement is particularly significant in that without it there is no hard copy at the remote terminal, as there would be when using an electric typewriter in which the original typing is normally done upon paper and in which the text can be called out of central memory and automatically typed out on paper when desired. If hard copy is not necessary, the CRT proof display unit provides at least temporary copy from which proofing and editing review can be obtained.

Figure 4:
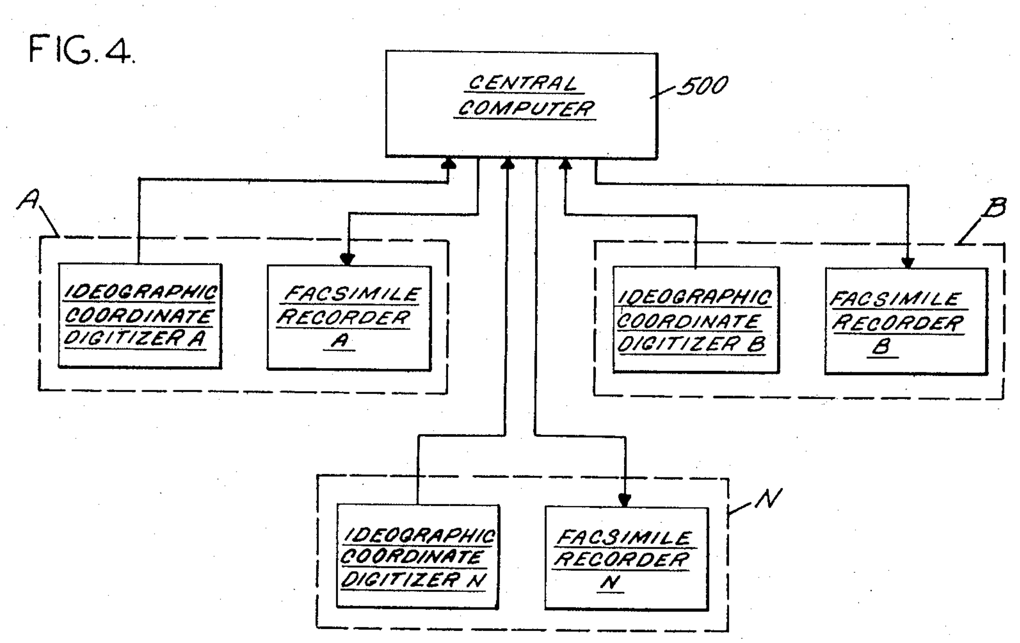
FIG. 4 is a block diagram illustrating a combination in accordance with the invention utilizing an ideographic data input device and a facsimile recorder at a terminal remote from a central computer.

FIG. 4 illustrates another application of the ideographic coordinate digitizer of the invention. In this arrangement there is provided a first remote terminal A consisting of ideographic coordinate digitizer A and associated facsimile recorder A; a second remote terminal B consisting of another ideographic coordinate digitizer B and its associated facsimile recorder B; and a third remote terminal N consisting of an ideographic coordinate digitizer N and its associated facsimile recorder N, it being understood that any number of such terminals may be utilized. Each ideographic coordinate digitizer is connected to a central computer 500 to supply signals thereto, and each facsimile recorder receives signals from the central computer.

In one relatively simple application, such a system as is shown in FIG. 4 may be used for what corresponds to ordinary typewriting in phonetic languages. That is, each of the terminals A, B and N may be located in the same building much as typewriters are located at different positions in a business establishment, and the central computer 500 might be located somewhere in that same building. When any ideographic coordinate digitizer has been utilized to form one line of text, it may automatically signal the central computer 500 to send back that line of text to the facsimile recorder corresponding thereto, whereby the operator is able to see the line last entered into the system. This arrangement may of course be utilized to read out the entire text when it is completed; it may also be utilized, with appropriate multiplexing, to provide local facsimile readout of the ideograph which the operator has just put into the system, similar to the hard-copy produced when one operates a typewriter. This enables the operator to see what he is doing as he proceeds, on a symbol-by-symbol, line-by-line, or on a longer term basis.

Accordingly there has been provided an ideographic data input device suitable for use in a wide range of applications, and particularly advantageous combinations thereof with memory storage apparatus whereby stored data representing the ideographic characters may be retrieved and utilized for proof display and/or for automatic publication purposes. The ideographic input device also provides, in its preferred form, for the convenient insertion of necessary input/edit and format signals whereby the ideographic input portion of the device may be integrated conveniently into a high speed automatic publications system.

While the invention has ben described with particular reference to the specific embodiments thereof in the interest of complete definiteness, it will be understood that it may be embodied in a variety of forms diverse from those specifically shown and described, without departing from the spirit and scope of the invention as defined by the appended claims.

What is claimed is:

1. Publications apparatus, comprising:

phototypesetting means responsive to character-forming signals applied thereto to produce a photographable display of characters;

computer means comprisng means for storing digital data representative of ideographic characters;

at least one ideographic data-input terminal remote from said computer means, said terminal comprising an array of visible ideographic characters, pointer means for designating selected ones of said characters in said array, and coordinate sensing means responsive to said designating of said characters for producing coordinate signals representative of the coordinates of said selected character;

means for transmitting said coordinate signals to said computer means;

said computer means being responsive to said coordinate signals to retrieve said data corresponding to said selected ones of said characters and to apply corresponding character-forming signals to said phototypesetting means to form therein a display of said selected characters;

local display means at said data-input terminal responsive to said retrieved data to form a local display of said selected characters at said terminal; and said local display means comprising a facsimile recorder.

2. Publications apparatus, comprising:

phototypesetting means responsive to character-forming signals applied thereto to produce a photographable display of characters;

computer means comprising means for storing digital data representative of ideographic characters;

at least one ideographic data-input terminal remote from said computer means, said terminal comprising an array of visible ideographic characters, pointer means for designating selected ones of said characters in said array, and coordinate sensing means responsive to said designating of said characters for producing coordinate signals representative of the coordinates of said selected character;

means for transmitting said coordinate signals to said computer means;

said computer means being responsive to said coordinate signals to retrieve said data corresponding to said selected ones of said characters and to apply corresponding character-forming signals to said phototypesetting means to form therein a display of said selected characters;

local display means at said data-input terminal responsive to said retrieved data to form a local display of said selected characters at said terminal; and said local display means comprising a cathode-ray tube display, said apparatus also comprising scan converter means adjacent said computer means for generating output signals representing a version of said display of characters which is of lower definition than said display in said phototypesetting means, and means for supplying said output signals to said local display means.

3. Publications apparatus, comprising:

phototypesetting means responsive to character-forming signals applied thereto to produce a photographable display of characters;

computer means comprising means for storing digital data representative of ideographic characters;

at least one ideographic data-input terminal remote from said computer means, said terminal comprising an array of visible ideographic characters, pointer means for designating selected ones of said characters in said array, and coordinate sensing means responsive to said designating of said characters for producing coordinate signals representative of the coordinates of said selected character;

means for transmitting said coordinate signals to said computer means;

said computer means being responsive to said coordinate signals to retrieve said data corresponding to said selected ones of said characters and to apply corresponding character-forming signals to said phototypesetting means to form therein a display of said selected characters;

local display means at said data-input terminal responsive to said retreived data to form a local display of said selected characters at said terminal; and said array also comprising symbols representing publications command symbols.

4. Publications apparatus, comprising:

phototypesetting means responsive to character-forming signals applied thereto to produce a photographable display of characters;

computer means comprising means for storing digital data representative of ideographic characters;

at least one ideographic data-input terminal remote from said computer means, said terminal comprisng an array of visible ideographic characters, pointer means for designating selected ones of said characters in said array, and coordinate sensing means responsive to said designating of said characters for producing coordinate signals representative of the coordinates of said selected character;

means for transmitting said coordinate signals to said computer means;

said computer means being responsive to said coordinate signals to retrieve said data corresponding to said selected ones of said characters and to apply corresponding character-forming signals to said phototypesetting means to form therein a display of said selected characters;

local display means at said data-input terminal responsive to said retrieved data to form a local display of said selected characters at said terminal; and said array also comprising symbols representing phonetic characters.

* * * * *